United States Patent [19]

Flynn et al.

[11] 4,189,097
[45] Feb. 19, 1980

[54] DEVICE FOR CONTROLLING HEAT

[75] Inventors: M. Rutledge Flynn; Raymond P. Schultz, both of Wilkes-Barre, Pa.

[73] Assignee: Control Devices, Inc., Wilkes-Barre, Pa.

[21] Appl. No.: 835,226

[22] Filed: Sep. 21, 1977

[51] Int. Cl.² .............................................. F24D 3/00
[52] U.S. Cl. .................................. 237/8 R; 236/91 F
[58] Field of Search ................. 236/46 R, 91 F, 91 D; 237/8 R

[56] References Cited

U.S. PATENT DOCUMENTS 2,555,990   6/1951   Newton ............................ 236/91 F
3,076,606   2/1963   Garvey et al. ................ 236/91 F X Primary Examiner—William E. Wayner
Attorney, Agent, or Firm—Stuart E. Beck

[57] ABSTRACT

A programmable device for controlling the amount of heat supplied to a building by a circulating medium by enabling a circuit to a heater such as an oil or gas burner, or a steam valve to open and close during predetermined times and in response to the temperature of the outside air and the temperature of the medium. The predetermined times can occur during a multi-day cycle such as a week. As the outside air temperature rises and falls, the circuit will be opened or closed depending on whether the device is at a predetermined time and whether that temperature falls above or below a predetermined value and depending on the temperature of the circulating medium. Additionally, the device can be set so that when the outside air temperature falls below a predetermined level the circuit is closed to add heat to the building without regard to where in the program cycle the device is. Conversely, the device can be set so that when the outside air temperature reaches a predetermined maximum, the circuit is opened to halt the addition of heat to the building not without regard to where in the program cycle the device is.

11 Claims, 9 Drawing Figures

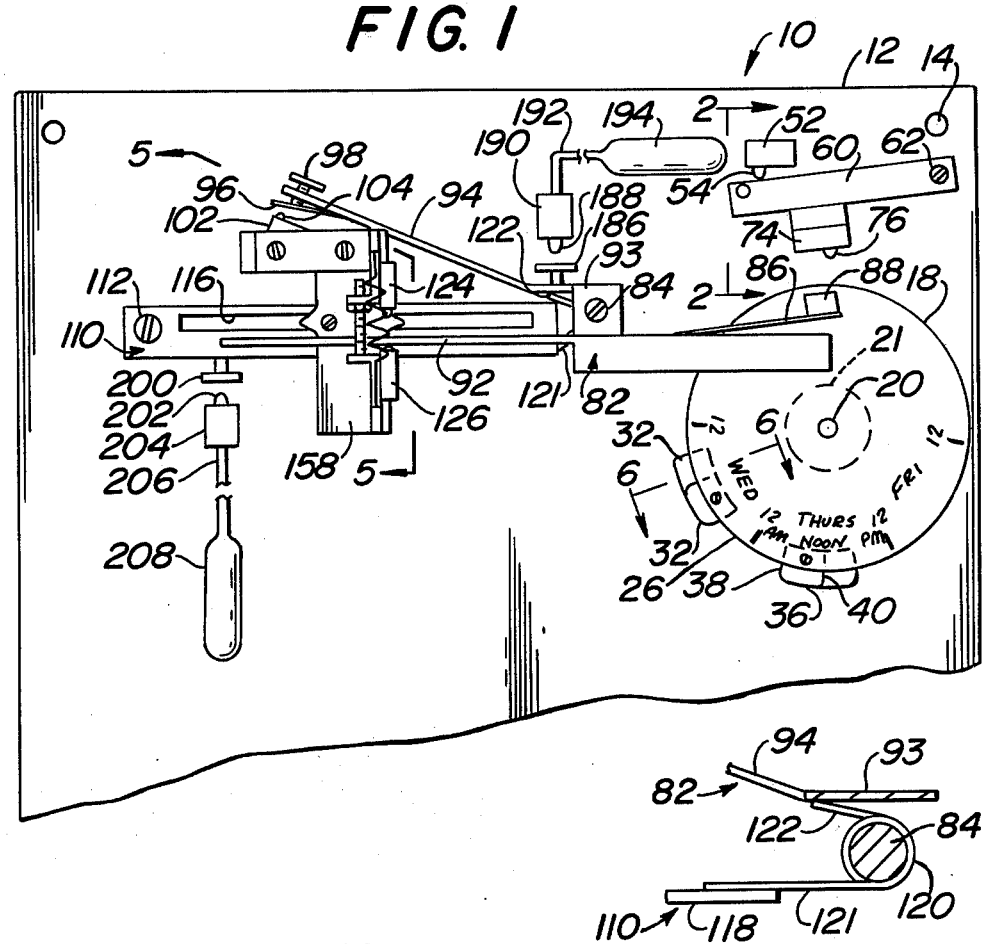
FIG. 1
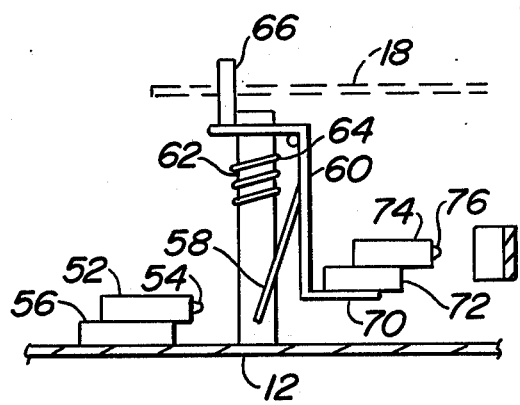
FIG. 9
FIG. 2

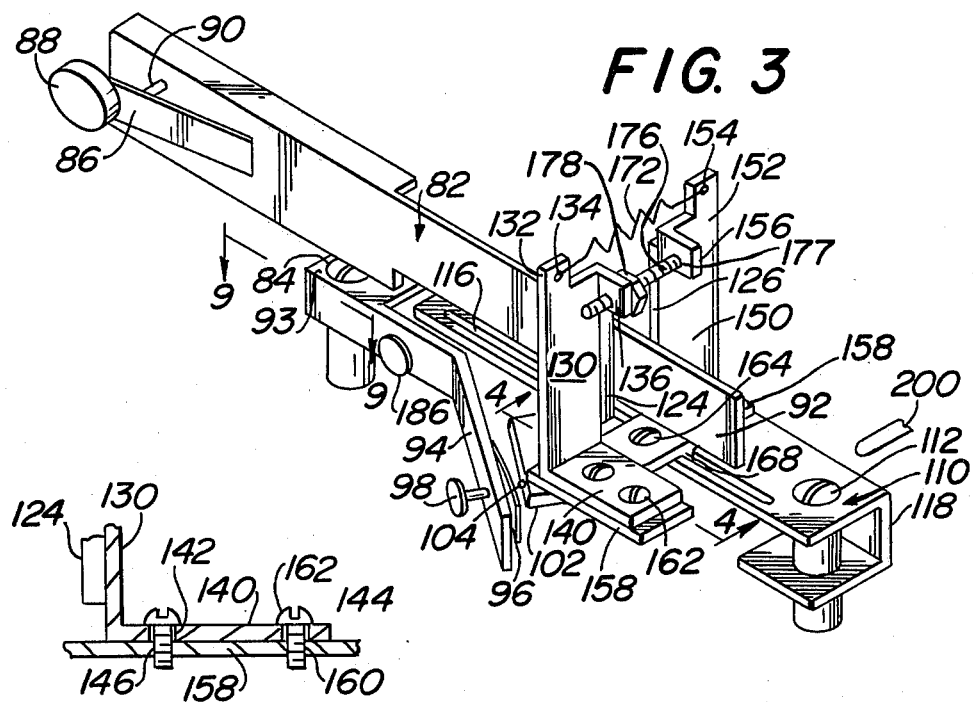

DEVICE FOR CONTROLLING HEAT

This invention relates to a programmable heating control device and more particularly to a heating control device which is adapted to supply heat for a building during a predetermined time period and in response to the outside air temperature when that temperature falls within a predetermined range, to supply heat when the outside air temperature falls below said range and to stop the heat when that temperature rises above the said range. The supply is further controlled by monitoring the temperature of the circulating heating medium so that when the heating medium rises to a predetermined temperature, the circuit controlling the heater is opened to stop the heat.

Every heated building looses heat to the outside through its foundation, outside walls and roof. The rate of heat loss is proportional to the difference between the inside and outside temperature so that at a lower outside air temperature the rate of heat loss will be higher than if the outside air temperature were higher.

Thermostats, which are often used for measuring temperature inside a building are notoriously unreliable for determining when a heat source should supply heat to a building and when it should not supply heat. This is because the thermostat can only sample the temperature in its immediate vicinity. Thus, if a thermostat is located in a portion of a building which might be warmer or cooler than other portions of the building, then a distorted reading of the internal temperature of the building will be obtained so that the heat source may supply heat when it is unneeded and not supply heat when it is needed.

Further, heat is usually supplied from a central heat source through a heat distribution system to a number of locations in the building which is to be heated. This is accomplished by circulating a heating medium through the system. The heating medium may be hot water or steam which flows through a circulatory system which includes radiators, a pump and a boiler or it may be air which flows from a heated plenum chamber and ducts to registers in the various rooms which are to be heated. Air return ducts return the air to the plenum. Circulation of the air is accomplished by a fan.

In thermostat controlled systems, heat is supplied through the circulating medium and the pump or fan is energized when the thermostat detects a fall in temperature below a predetermined level. Some of the disadvantages of thermostat operation have been outlined above. However, a further disadvantage is that the heating medium supplied with a fixed quantity of heat without regard to how far below the desired temperatures, the building temperature has dropped. When the medium is excessively hot the space that is being heated is brought to a temperature exceeding that which is desired by the time that the thermostat recognizes that the heater should be de-energized.

Further, it is often desirable to supply less heat to a building at certain times than at other times. For example, a lower temperature may be desired in the evening as opposed to during the day, when people are working. In such circumstances, it is necessary to bring the building up to the desired day time temperature by supplying heat for an interval prior to the time when the first people are to arrive. This has been accomplished by providing programmable means. However, with most of these devices the time interval during which morning heat is supplied to the building is uniform without regard to the outside air temperature or the temperature of the circulating medium. Thus, there exists the likelihood of overheating the building while attempting to bring it up to temperature.

In recognition of the foregoing problems, the present invention generally relates to a device for controlling heat by controlling the heat source in response to variations of the outside air temperature and the temperature of the circulating medium. Thus, it energizes the heat source only for a sufficient period of time to supply to the building enough heat to replace the heat which is lost to the outside through the side walls, foundation and roof.

The duration of time during which heat is supplied is controlled by de-energizing the heating source when the temperature of the heating medium or the outside air rises above a predetermined level value. Further, the duration of time during which heat must be supplied to the building in the morning to bring it up to the desired temperature is controlled by the temperature of the outside air, since at a lower air temperature heat is supplied to the building for a longer time than at higher temperatures.

For the purpose of illustrating the invention, there are shown in the drawings certain forms which are presently preferred, it being understood, however, that this invention is not limited to the precise arrangements and instrumentalities shown and wherein:

FIG. 1 is a top plan view of a heat control device constructed in accordance with a presently preferred form of the invention.

FIG. 2 is a sectional view taken along the line 2—2 of FIG. 1.

FIG. 3 is a partial perspective view of a portion of the heat control device illustrated in FIG. 1.

FIG. 4 is a sectional view taken along line 4—4 of FIG. 3.

FIG. 5 is a sectional view taken along line 5—5 of FIG. 1.

FIG. 6 is a sectional view taken along 6—6 of FIG. 1.

FIG. 7 is a top perspective view of the portion of the device illustrated in FIG. 6.

FIG. 9 is a sectional view taken along line 9—9 of FIG. 3.

Figure 8:
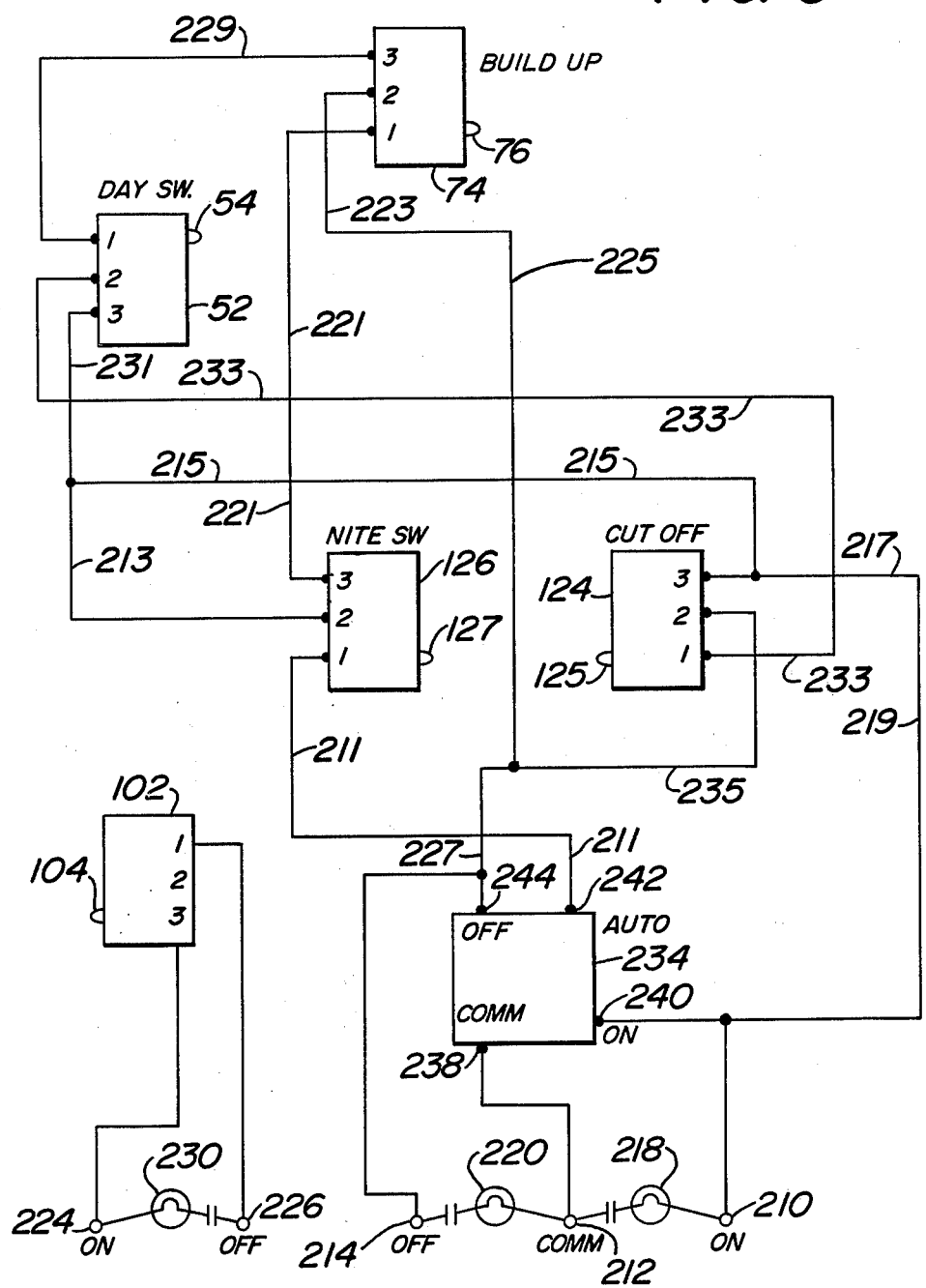
FIG. 8 is a schematic drawing of the electric circuit of the heat control device.

Now referring to the drawings for detailed description of the invention, the heat control device 10 may be supported on a base 12 which may be any suitable member such as the flat plate shown. The base may be mounted in a suitable protective container such as a metal box (not shown) by way of screws which are threaded through apertures 14 in the base.

The device includes a programming member 18 which may be mounted on a shaft 20 which extends upwardly from a timing motor 21. The programming member is shown undersize so that the elements under and near it can be seen. The shaft 20 is rotated through a complete rotation in a given time period by the timing motor 21. The device illustrated has a seven day cycle. However, the cycle could be shorter or longer, depending on the speed at which the motor drives shaft 20.

As seen in FIG. 6, programming member 18 comprises upper and lower discs 22 and 24 which are generally of the same diameter and which define a circumferential edge 26 and an intermediate disc 28 of reduced diameter. The space between the upper and lower discs adjacent the perimeter of the intermediate disc 28 is occupied by a plurality of cams 32. Each of the cams 32 (FIG. 7) is a generally elongated arcuate member having an inner edge 34 which is arcuate so that it can lie along the periphery of intermediate disc 28. It includes an arcuate outer edge 36, a sloped leading edge 38 and a radially directed trailing edge 40.

The cams 32 may be of sufficient thickness so that two of them may be arranged in overlapping fashion between the upper and lower discs 22 and 24.

Each of the cams has an elongated arcuate slot 42 extending through substantially its entire length. A threaded member such as screw 46 passes through appropriate openings in the upper and lower discs 22 and 24 and through the slots 42 in the cams 32 in order to retain the cams in a desired location on the programming member.

As best seen in FIG. 1, the circumference of the programming member 18 may be divided into a plurality of sectors, each of which corresponds to one of the days of the week (only some of which are shown). Since according to the circuit which is disclosed, the high portions i.e., edges 36 of the cams 32 correspond to those times periods during which the device is programmed to supply heat to the building if necessary, the cams can be moved around the circumference of the programming member relative to screws 46 so that the device can be desirably programmed for any convenient time period.

For example, as illustrated in FIG. 1, on a Wednesday, the cams 32 have been arranged so that the heat can be supplied to the building from 8:00A.M. to 11:00P.M. To be able to supply heat during a shorter interval, the cams 32 would be adjusted so that the extent to which they overlap would be increased. To be able to supply heat to the building was to be increased, during a longer interval the cams 32 would be moved so that the extent to which they overlap would be reduced thereby increasing the programmed heating time.

While the arrangement of the cams 32 has been explained with respect to only one day of the week, each of the other days of the week has its own cams 32 which can be adjusted in a similar fashion. If no programmed heating were desired on a particular day, such as a Sunday, the cam for that day could be removed.

Referring again to FIGS. 1 and 2 a first switch 52 having an operator 54 is supported on base 12 by a pad 56. The switch operator 54 is engagable with a tab 58 which extends downwardly from lever 60. Lever 60 is an elongated member that is pivotally connected to base 12 by a pivot pin 62. It is urged in a counterclockwise direction by a helical coil spring 64 which may be wrapped around pin 62 so that the tab 58 is normally urged in a counterclockwise direction away from operator 54. An upwardly extending cam follower 66 is supported at the end of the arm that is remote from pin 62. The follower is positioned so that it will be urged against the cams on the programmer 18. Lever 60 also includes a laterally directed tab 70 which supports a pad 72 and a switch 74 having an operator 76 which faces in the same dirdction as the operator 54 of the switch 52.

Lever 82 is an elongated member that is pivotally connected to the base 12 by a pin 84. Pin 84 is spaced from pin 62. At one end lever 82 includes a laterally extending resilient tab 86 which supports, at its distal end, a switch operator pad 88. The switch operator pad is adjustably positioned relative to lever 82 by threaded member 90 so that it can engage switch operator 76 on switch 74 as will be explained more fully herein.

The opposite end of the lever 82 comprises a vertically disposed blade 92.

Intermediate its ends, the lever 82 includes a laterally extending bracket 93 through which pin 84 extends. The bracket 93 supports a laterally extending and rearwardly directed leg 94. Leg 94 supports a resilient tab 96 which may be moved toward and away from tab 96 by threaded member 98 so that it may engage switch 102 which is supported on base 12 and which includes an operator 104.

Referring to FIGS. 1, 3 and 4, lever 110 is pivotally connected to base 12 by a pin 112 in spaced relation from pin 84 and on the opposite side of pin 84 from which pin 62 is located. Lever 110 includes an upper portion 114 having an elongated longitudinally extending slot 116 and a downwardly depending leg 118.

Levers 82 and 110 are biased by a spring 120 (FIG. 9) in clockwise and counterclockwise directions respectively. The spring may be a coiled helical spring which is wrapped around pin 84 and which has one arm 121 bearing against a portion 118 of lever 110 and another portion 122 bearing against bracket 93 on lever 82.

Lever 110 supports switches 124 and 126 for cooperation with aforementioned blade 92 in a manner that will be explained. Each of the switches includes an operator 125 and 127 respectively and are arranged so that the operators 125 and 127 face each other.

Switch 124 is supported on a vertically extending plate 130 that includes an upwardly directed ear 132 having an aperture 134. On its edge facing the operator 127 for switch 126 it includes a rearwardly extending ear 136, that has a threaded aperture 138. Its lower portion includes a rearwardly extending tab 140 which includes first and second spaced apertures 142 and 144.

Plate 150 is coplanar with plate 130 and supports switch 126. It includes an upwardly extending ear 152 which includes an aperture 154. On its edge which is adjacent to switch 124 plate 150 includes a rearwardly extending ear 156. Its lower portion includes a rearwardly and transversely extending plate 158 which extends beneath blade 92 and underlies the rearwardly extending tab 140 on plate 130. Referring to FIG. 4, plate 158 includes a threaded aperture 146 which is somewhat smaller than but which is aligned with aperture 142. It also includes a further rearwardly located threaded aperture 160 which is substantially the same size as aperture 144.

The mid portion of transversely extending plate 158 includes an aperture through which a threaded fastener such as screw 164 extends. The screw is engaged on the underside of the upper surface of lever 114 by a nut (not shown). Forwardly and rearwardly extending and downwardly directed tabs 166 and 168 (FIGS. 3 and 5) which are connected to the front rear edges of transversely extending plate 158 extend through slot 116. Tabs 166 and 168 and screw 164 enable the switches 124 and 126 to be displaced longitudinally along the slot 116 and be retained at any location along that slot for a reason that will be explained herein.

Apertures 144 and 160 are interconnected by a screw 162. Aperture 142, as explained earlier is somewhat larger than aperture 146 below it so that plate 130 can pivot about screw 162 relative to plate 150. This enables the distance between switches 124 and 126 to be adjusted. The distance is maintained by the cooperation of a helical compression spring 172 which is anchored at each of its ends in one of the apertures 134 and 154, and a threaded member 176 which has one end threaded through an aperture 177 in tab 140 and which has its other end bearing against tab 156. The threaded member is adjusted by rotating it through the aperture and it is locked in position by lock nut 178.

Referring again to FIG. 1, a threaded member 186 having an enlarged end is threadingly received in an aperture in leg 94. It lies adjacent a pin 188 which extends from a bellows 190 that is supported on the base. The bellows is connected by an elongated capillary tube 192 to a bulb 194. The bulb, tube and bellows are filled with an expandable liquid. As the liquid warms, its expansion forces pin 188 against member 186 thereby forcing lever 82 to rotate in a counterclockwise direction about pin 84. As bulb 194 cools, the pin withdraws and the lever 82 rotates in a clockwise direction under the force of spring 120.

A threaded member 200 having an enlarged end is threadedly received in the downwardly extending leg 118 of lever 110 adjacent pin 112. The member 200 is disposed adjacent a pin 202 which extends from a bellows 204. The bellows is supported on the base and is connected to an elongated capillary tube 206 which is connected at its other end to an enlarged bulb 208. The bellows, tube and bulb are filled with an expandable liquid. They cause lever 110 to rotate clockwise when the bulb warms and counter clockwise under the force of spring 120 (FIG. 9) when it cools. When the heat control device is installed for operation bulb 194 is placed outside the building while bulb 208 lies in an air return or in the boiler water return so that the temperature of the returning circulating medium can be detected.

Referring now to FIG. 8, each of the switches 52, 74, 102, 124 and 126 are of the single pole, double throw type. They have one common terminal which is normally closed on one of the other terminals so that normally the common terminal is not connected to the other terminal. The normal condition occurs when the operators of the respective switches are not compressed. For the purposes of simplification, each of the common terminals for each switch is identified by the numeral "1", each normally opened terminal is identified by the numeral "2" and each normally closed terminal is identified by the numeral "3". Thus, a circuit through the normally opened terminal of switch 52 can be designated 1-2 while a circuit through the normally closed terminal of that switch can be designated by 1-3; the former indicating that operator 54 is depressed and the circuit is through terminals 1 and 2 while the later indicates that the operator 54 is not depressed and the circuit is through terminals 1 and 3.

Terminals 210, 212 and 214 may be supported on base 12 in a convenient location. They may be identified as "Heat Source On", "Common" and "Heat Source Off" respectively. A circuit completed between terminals 210 and 212 will energize the heat source by completing its circuit. In FIG. 8 the portion of the heat source circuit which will cause heat to be provided is represented by the light 218, which has its circuit to its power source coupled to terminals 210 and 212. The circuit portion represented by the light 218 may be the energizing switch for an oil or gas burner, or it may be the motor that opens a steam valve.

If the circuit between terminals 210 and 212 is opened, the energizing switch for the above mentioned oil or gas burner will be turned off.

However, the steam valve would not close. Therefore when the circuit between terminals 210 and 212 is opened, a circuit between terminals 212 and 214 must be closed and the steam valve motor (now represented by light 220 which has its circuit to its power source coupled to terminals 212 and 214) is now energized to close the valve. When light 220 is lit, the circuit to close the steam valve is complete. Switch 102 is connected to a circulator such as a pump or fan (not shown) which is connected across terminals 224 and 226. The circulator is represented by light 230.

A hand switch, indicated schematically by box 234 may be provided for selecting the various modes in which the control device is to be operated. It includes a "Common" terminal 238, "ON" terminal 240, "AUTO" terminal 242 and an "OFF" terminal 244. Other terminals (not shown) may be provided for supplying power to the motor for programmer 18.

The hand switch may be manually turned to couple common terminal 238 to any one of the other terminals 240, 242, or 244 depending on the manner of operation which is desired for the device.

When the hand switch 234 is turned to complete a circuit between terminal 238 and 240 the heating source is energized by way of terminals 210 and 212, and will run continuously.

When the hand switch is turned to complete a circuit between terminal 238 and 244, a circuit is completed through terminals 212 and 214. This circuit does not energize the heat source. However, in those systems which are steam operated and in which a valve was opened by a circuit through terminals 210, and 212, that valve is now closed through the circuit created through terminals 212 and 214. The heat source will thus be shut off.

When the hand switch is turned to complete a circuit between terminal 238 and terminal 242 the device will only supply heat in accordance with the position of the programmer 18 and the extent to which the outside air and the circulating medium temperatures have rotated the levers which they control. The manner in which these elements cooperate to control the supply of heat can best be understood by examining the operation of the device at a particular time.

Assume that the portion of the cycle which is selected for examination is during an hour of the day when the building is not to be heated such as the evening. However, the outside air temperature has fallen below a predetermined temperature (for example 55° F.). In this situation follower 66 lies along edge 26 of the programming member 18 and operator 76 is depressed by pad 88; placing switch 74 in state 1-2 and switch 52 in state 1-3. Pins 188 and 202 have withdrawn into their respective bellows due to the low temperatures and levers 82 and 110 are displaced under the force of spring 120 counter clockwise and clockwise respectively. This causes blade 92 to depress operator 127 on switch 126 placing it in state 1-2 while switch 124 is in state 1-3. In this configuration, a circuit to light 218 is completed through terminals 212, 238 and 242, line 211, terminals 1-2 of switch 126, lines 213, 215, 217, 219 and terminal 210 to energize the heat source. Also, clockwise rotation of lever 82 moves tab 96 away from operator 104 placing switch 102 in state 1-2 thereby energizing the circulator (light 230) to force the heating medium through the system. The low temperature at which switch 126 goes to state 1-2 is controlled by member 186. If that member is normally close to pin 188 the heat will go on at a lower temperature than if it is normally far from pin 188.

As the building warms, the temperature of the circulating medium will rise forcing pin 202 against member 200 and rotating lever 110 counterclockwise about its pivot until a predetermined temperature is reached whereupon blade 92 releases operator 127. This puts switch 126 in state 1-3 to complete a circuit through line 211, terminals 1-3 of switch 126, line 221, terminals 1-2 of switch 74, and lines 223, 225 and 227 to "OFF" terminal 214 thereby deenergizing the heat source and closing the steam valve.

The temperature at which switch 124 goes from state 1-2 to 1-3 is controlled by member 200. If that member is normally close to pin 202 the operator will be depressed at a lower temperature of the circulating medium than if it is normally far from pin 200. Since both members 186 and 200 are adjustable changes or adjustments in the switching temperatures can readily be made.

Switch 102 is still in state 1-3 since lever 82 has not been moved. Therefore heating medium will continue to be circulated. If the building begins to cool, the medium will cool and pin 202 will withdraw into bellows 204 causing operator 127 to be depressed, switch 126 to go to state 1-2 and the heat source to be energized.

If the outside air temperature were to rise, pin 188 would bear against member 186 causing lever 82 to rotate counterclockwise. A the lever rotates, the pressure on operator 127 will be released and switch 126 will go to state 1-2 de-energizing the heater and tab 96 will depress operator 104 to de-energize the circulator.

Continued rotation of the programmer 18 through its cycle will cause follower 66 to begin to travel up the sloped edge 38 of cam 36. This will cause lever 60 to rotate clockwise away from operator pad 88. At some point in its rotation, the lever will cause pad 88 to release operator 76 and permit switch 74 to go to state 1-3. When switch 74 goes to state 1-3 the device will begin a warm up cycle to add to the building the heat that was lost at night and to bring it up to a suitable daytime temperature. However, while the sloped edge may give a maximum warm up time of, for example, two hours, a raised outside air temperature will cause the warm up to start at a later time and thus be less than two hours. This is because at a raised outside air temperature lever 82 is rotated counterclockwise, thereby keeping switch 76 in state 1-2 for a longer time.

During the warm up cycle a circuit goes through terminals 1-3 of all switches to energize the heater. The circuit includes line 211, terminals 1-3 of switch 126, line 221, terminals 1-3 of switch 74, line 229, terminals 1-3 of switch 52, lines 231, 215, 217 and 219. Even if the temperature of the circulating medium rises to its cut off the heater will stay energized since switch 126 will go to state 1-2 with all of the other switches by-passed.

The circulator remains energized until the outside air temperature rises sufficiently to rotate leg 94 toward switch 102 to place it in state 1-2.

The warm up cycle ends when follower 66 reaches edge 36 on cam 32, which is the interval during which it is desired to maintain the building at a higher temperature on cam 32 and tab 58 puts switch 52 in state 1-2 (the day time configuration).

While in the daytime configuration whether or not the building gets heat when switch 52 is in state 1-2 will depend on the angular relationship of levers 110 and 82 as they are controlled by their respective temperature sensing bulbs 194 and 208. Thus, if at a predetermined outside air temperature and circulating medium temperature there is not sufficient relative displacement to prevent blade 92 from depressing operator 127 on switch 126 that switch will go into its 1-2 configuration and complete a circuit to "ON" terminal 210. As the temperature in the building rises the temperature of the heating medium will also rise causing an expansion of bulb 208 and rotation of lever 110. This will cause blade 92 to move away from operator 127 and return switch 126 to its 1-3 state. That switch will then complete a circuit which energizes the heat source by way of line 211, terminals 1-3 of switch 126, line 221, terminals 1-3 of switch 74, line 229 terminals 1-2 of switch 52, line 233, terminals 1-3 of switch 124 and lines 217 and 219 to continue to energize the heat source. As the temperature of the conducting medium continues to rise, it will eventually reach the temperature at which rotation of lever 110 will cause switch 124 to go into state 1-2 thereby deenergizing the heat source through a circuit that includes terminals 1-2 of switch 124, lines 235 and 227.

Continued rotation of programmer 18 will cause the follower to drop down radially directed edge 40 to edge 26 of the cam thereby returning the system to the beginning of that portion of the cycle where less heat is needed for the building On the other hand if the outside air temperature were to rise, lever 82 will rotate away from switch 126 a sufficient distance so that blade 92 will cause switch 124 to go to state 1-2 thereby de-energizing the heat source.

As explained earlier the plates on which switches 124 and 126 are mounted are slidable longitudinally in slot 116 in lever 114. This arrangement is provided so that the capacity of the heat source to heat the circulating medium and the area design temperature can be taken into account. Thus, the heat source usually has a high limit control which identifies in degrees the highest temperature to which it will heat the liquid. This can be anywhere from between 100° to about 240°.

The Area Design Temperature is the lowest temperature which can normally be expected to be reached in a particular region. It is this temperature to which the heating system for a building including the heat source and heat transfer means are designed.

For a given area design temperature if a heating source has a relatively high limit control the switches are moved along slot 116 closer to pivot 112 and if there is a relatively low design limit than they are moved further from pivot 112. Thus, if a heat source has the capacity to heat the circulating medium to a relatively high temperature, it need not be energized as frequently. Consequently, the likelihood of switch operator 127 being depressed for a longer period of time is greater when switch 124 is close to pivot 112. If the high limit control is relatively low then it is apparent that switch operator 127 will have to be released at a greater interval of time to enable the heat source to be energized. This is accomplished when that switch is moved to the other end of slot 116. Thus, at the end of lever 110 which is remote from pivot 112 the expansion and contraction of bulb 208 as it mvoes 202 from bellows 204 is amplified to a greater extent.

While the invention has been described with respect to a particular form it is apparent that other forms and embodiments will be obvious to those skilled in the art in view of the foregoing description. Thus, the scope of the invention should not be limited by the foregoing description but rather, only by the scope of the claims appended hereto.

We claim:

1. A device for controlling the heat supplied to a space by a circulating medium comprising an electric circuit for controlling a heat source, a first lever mounted for pivotal movement in response to changes in the temperature of air outside said space a second lever mounted for pivotal movement through a range in response to changes in the temperature of said circulating medium, two switches mounted on said second lever for movement therewith, and said first lever engages one of said switches when said second lever is in a first portion of said range to actuate a heat source for said medium, said first lever engaging said second switch when said second lever is in a second portion of said range to deactuate the heat source, said first lever lies between said switches when said second lever is in a third portion of said range and said switches are selectively engated as said first and second levers rotate about their pivots.

2. A device as defined in claim 1 including two more switches and a third lever, said third lever being mounted for rotation in response to the movement of a clock controlled cam to selectively engage said switches so that said heat source is further controlled by the selective engagement of said two more switches.

3. A device for controlling the heat supplied to a space by a circulating medium which is heated by a selectively energizable and de-energizable heater comprising first and second switches, means for selectively connecting said first switch to said second switch and to the energizable and de-energizable heater, means for selectively connecting said second switch to the energizable and de-energizable heater, means for supporting said first and second switches in spaced relation from each other and for moving said first and second switches through a predetermined range in response to changes in the temperature of the circulating medium, means for selectively engaging said first and second switches for causing each of said switches, when engaged, to make their respective selective connections, said switch engaging means being movable through a predetermined range in response to changes in the temperature of the air outside the space, said selective engaging means and said means for supporting said first and second switches cooperating to selectively energize and de-energize the heater so that the heater is energized when said switches and said switch engaging means are in a first predetermined position in response to the temperatures of the air outside the space and the temperature of the circulating medium, and the heater is de-energized when said switches and said switch engaging means are in a second predetermined position in response to the temperatures of the outside air and circulating medium.

4. A device as defined in claim 3 wherein said means for supporting said first and second switches comprises a lever and an elongated temperature responsive expandable member, said lever being mounted on said device for rotation about a pivot, one end of said elongated member including means for detecting the temperature of the circulating medium and the other end of said elongated member being engagable with said lever so that said lever moves through said predetermined range as said expandable member expands and contracts.

5. A device as defined in claim 3 wherein said means for selectively engaging said first and second switches comprises a lever, and an elongated temperature responsive expandable member, said lever being mounted on said device for rotation about a pivot, one end of said elongated member including means for detecting the temperature of the air outside the space and the other end of said elongated member being engagable with said lever so that said lever moves through said predetermined range as said expandable member expands and contracts.

6. A device as defined in claim 3 wherein said means for supporting said first and second switches comprises a first lever which is mounted on said device for rotation, said means for selectively engaging said first and second switches comprises a second lever, the pivots for said first and second levers being spaced from each other and said first and second levers overlying each other, means on said switches and on said first lever cooperating to enable said switches to be located along the length of said first lever so that the length of time that the heater for the circulating medium is energized can be increased for spaces in cooler regions and reduced in warmer regions while said first and second levers move under the force of the temperatures of the circulating medium and the air outside the space.

7. A device for controlling the heat supplied to a space by a circulating medium which is heated by a selectively energizable and de-energizable heating system comprising first and second groups of switches for completing a circuit to the heater, some of said switches being mounted on levers for pivotal movement, means for detecting changes in the temperature of the air outside said space, means for detecting the temperature of the circulating medium, means for creating a predetermined cycle corresponding to time intervals when heat is desired and time intervals when heat is not desired, said first group of switches being selectively engagable by some of said levers as the relative positions of said levers and switches change in response to changes in the temperature of the circulating medium and of the air outside said space to selectively enable a circuit to said energizing and de-energizing means, said second group of switches being selectively engagable by some of said levers as the relative positions of said levers and second group of switches change in response to said cyclical intervals to selectively enable circuits to energize and de-energize said heating system, means for electrically interconnecting said first and second groups of switches so that when a predetermined lower temperature of the air outside said space is reached or a predetermined upper circulating medium temperature is reached said first group of switches energize and de-energize said heating system respectively, and when said last named temperatures are above and below said last named predetermined temperatures, respectively, said second group of switches energize and de-energize said heating system.

8. A device as defined in claim 7 wherein
one of said levers supports said first group of switches, said one lever being movable in response to changes in the temperature of the circulating medium,
the switches in said first group being engagable by another lever,
and said other lever being movable in response to changes in the temperature of the air outside said space.

9. A device as defined in claim 8 wherein
said first group of switches includes two switches, said switches being in mutually facing relation, and a portion of said other lever is disposed between said two switches.

10. A device as defined in claim 8 wherein
means are provided for fixing said first group of switches at a plurality of locations along said one lever in accordance with the Area Design Temperature for the location of the space which is to be heated.

11. A device as defined in claim 7 wherein
one of the switches in said second group of switches is fixed, and another of said switches in said second group is mounted on one of said levers for movement therewith so that said fixed switch is engaged by said last named lever as said last named lever moves in response to said cyclical intervals, and
said other switch is engaged by one of said other levers as it moves in response to the temperature of the air outside said space.

* * * * *